US012564785B2

(12) United States Patent
Tsytsarkin

(10) Patent No.: US 12,564,785 B2
(45) Date of Patent: Mar. 3, 2026

(54) ENABLING LOCAL SPLIT-SCREEN MULTIPLAYER EXPERIENCES USING REMOTE MULTIPLAYER GAME SUPPORT

(71) Applicant: Microsoft Technology Licensing, LLC, Redmond, WA (US)

(72) Inventor: Nikita Tsytsarkin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 391 days.

(21) Appl. No.: 18/247,626

(22) PCT Filed: Sep. 28, 2021

(86) PCT No.: PCT/US2021/071621
§ 371 (c)(1),
(2) Date: Mar. 31, 2023

(87) PCT Pub. No.: WO2022/076966
PCT Pub. Date: Apr. 14, 2022

(65) Prior Publication Data
US 2023/0381640 A1      Nov. 30, 2023

(30) Foreign Application Priority Data
Oct. 9, 2020   (LU) ........................................ 102111

(51) Int. Cl.
*A63F 13/355*      (2014.01)
*A63F 13/285*      (2014.01)
(Continued)

(52) U.S. Cl.
CPC .......... *A63F 13/355* (2014.09); *A63F 13/285* (2014.09); *A63F 13/335* (2014.09);
(Continued)

(58) Field of Classification Search
CPC ...... A63F 13/27; A63F 13/285; A63F 13/335; A63F 13/355; A63F 13/50; A63F 13/533;
(Continued)

(56) References Cited

U.S. PATENT DOCUMENTS

| | | | |
|---|---|---|---|
| 7,445,549 B1 * | 11/2008 | Best | A63F 13/12 463/31 |
| 7,458,894 B2 * | 12/2008 | Danieli | A63F 13/35 463/42 |

(Continued)

FOREIGN PATENT DOCUMENTS

| | | |
|---|---|---|
| WO | 2018004839 A1 | 1/2018 |
| WO | 2019074952 A2 | 4/2019 |

OTHER PUBLICATIONS

Cai, et al., "Toward Multiplayer Cooperative Cloud Gaming", In Journal of IEEE Cloud Computing, vol. 5, Issue 5, Sep. 2018, pp. 70-80.

(Continued)

*Primary Examiner* — William H Mcculloch, Jr.
(74) *Attorney, Agent, or Firm* — Workman Nydegger

(57) ABSTRACT

Presenting a local multiplayer experience for a multiplayer game that includes remote multiplayer support. A computer system establishes a plurality of game streams, each corresponding to a different instance of the multiplayer game. Each game stream corresponds to a different user identifier of a plurality of user identifiers that are joined to a single multiplayer session using the remote multiplayer support of the multiplayer game. The computer system associates each of a plurality of gaming interface devices with a different game stream. The computer system outputs a composite stream of the plurality of game streams, which simultaneously presents each game stream in a split-screen display format for display at a single display device. While outputting the composite stream of the plurality of game streams, (Continued)

the computer system causes input signals received from each gaming interface device to be routed to its associated game stream.

20 Claims, 7 Drawing Sheets

(51) Int. Cl.

| | |
|---|---|
| *A63F 13/335* | (2014.01) |
| *A63F 13/533* | (2014.01) |
| *A63F 13/54* | (2014.01) |
| *A63F 13/847* | (2014.01) |

(52) U.S. Cl.
CPC ............ *A63F 13/533* (2014.09); *A63F 13/54* (2014.09); *A63F 13/847* (2014.09); *A63F 2300/538* (2013.01)

(58) Field of Classification Search
CPC .. A63F 13/54; A63F 13/847; A63F 2300/516; A63F 2300/538
See application file for complete search history.

(56) References Cited

U.S. PATENT DOCUMENTS

| | | | | |
|---|---|---|---|---|
| 7,938,727 | B1 * | 5/2011 | Konkle | A63F 13/92 715/764 |
| 8,435,121 | B1 * | 5/2013 | Fisher | A63F 13/355 463/31 |
| 8,506,402 | B2 * | 8/2013 | Gault | H04L 67/131 463/40 |
| 9,067,150 | B2 * | 6/2015 | Konkle | A63F 13/27 |
| 10,715,846 | B1 * | 7/2020 | Tulewicz | H04N 21/482 |
| 11,260,295 | B2 * | 3/2022 | Mueller | A63F 13/77 |
| 2003/0216185 | A1 * | 11/2003 | Varley | A63F 13/27 463/42 |
| 2008/0214273 | A1 * | 9/2008 | Snoddy | G07F 17/3276 463/19 |
| 2009/0186700 | A1 * | 7/2009 | Konkle | A63F 13/12 463/42 |
| 2011/0088071 | A1 * | 4/2011 | Yerli | H04N 21/41415 725/74 |
| 2012/0142429 | A1 * | 6/2012 | Muller | A63F 13/69 463/42 |
| 2014/0195912 | A1 * | 7/2014 | Odorovic | H04N 21/25816 715/719 |
| 2016/0256784 | A1 * | 9/2016 | Schultz | A63F 13/45 |
| 2017/0050110 | A1 * | 2/2017 | Perry | A63F 13/48 |
| 2017/0087464 | A1 * | 3/2017 | Perry | A63F 13/352 |
| 2017/0165569 | A1 * | 6/2017 | van Welzen | H04N 7/147 |
| 2018/0001205 | A1 * | 1/2018 | Osman | A63F 13/67 |
| 2019/0366210 | A1 * | 12/2019 | Beltran | A63F 13/335 |
| 2023/0068527 | A1 * | 3/2023 | Mahlmeister | A63F 13/79 |
| 2023/0088988 | A1 * | 3/2023 | Krishnamoorthi | H04N 21/4316 725/46 |
| 2023/0381640 | A1 * | 11/2023 | Tsytsarkin | A63F 13/27 |
| 2023/0381672 | A1 * | 11/2023 | Henderson | A63F 13/355 |

OTHER PUBLICATIONS

Deng, et al., "Server Allocation for Multiplayer Cloud Gaming", In Proceedings of the 24th ACM International Conference on Multimedia, Oct. 15, 2016, pp. 918-927.

Green, Ollie, "How to Turn Any Multiplayer Game into Split-Screen on One PC", Retrieved from: https://www.online-tech-tips.com/fun-stuff/how-to-turn-any-multiplayer-game-into-split-screen-on-one-pc/, Jan. 9, 2019, 24 Pages.

Locke, Jennifer, "Does Stadia Support Split Screen Multiplayer?", Retrieved from: https://web.archive.org/web/20190322181146/https:/www.androidcentral.com/does-stadia-support-split-screen-multiplayer, Mar. 21, 2019, 3 Pages.

"Search Report and Written Opinion Issued in Luxembourg Patent Application No. LU102111", Mailed Date: Jun. 4, 2021, 7 Pages. (Ms# 408911-LU-NP).

O'Neill, Rebecca, "15 Best Split-Screen Multiplayer Games On PS4, Ranked", Retrieved from: https://web.archive.org/web/20200514035631/https://www.thegamer.com/best-split-screen-multiplayer-ps4-games/, Mar. 11, 2020, 23 Pages.

"International Search Report and Written Opinion Issued in PCT Application No. PCT/US21/071621", Mailed Date: Nov. 10, 2021, 11 Pages. (MS# 408911-WO-PCT).

Communication under Rule 71(3) Received in European Patent Application No. 21787286.0 (MS# 408911-EP01-PCT) mailed on Jan. 14, 2025, 07 pages.

Communication under Rule 71(3) Received in European Patent Application No. 21787286.0 (MS# 408911-EP01-PCT), mailed on Jun. 12, 2025, 07 pages.

Decision to grant a European patent pursuant to Article 97(1) received in European Application No. 21787286.0, (MS# 406781-EP01-PCT) mailed on Jul. 17, 2025, 2 pages.

* cited by examiner

ENABLING LOCAL SPLIT-SCREEN MULTIPLAYER EXPERIENCES USING REMOTE MULTIPLAYER GAME SUPPORT

CROSS-REFERENCE TO RELATED APPLICATIONS

The present application is a U.S. National Stage of International Application No. PCT/US2021/07621, filed on Sep. 28, 2021, designating the United States and claiming the priority of Luxembourg Patent Application No. LU102111 filed with the Luxembourg Intellectual Property Office on Oct. 9, 2020. All of the aforementioned applications are incorporated herein in their respective entireties by this reference.

TECHNICAL FIELD

The present disclosure relates to systems, methods, and devices that overcome technical limitations associated with multiplayer gaming.

BACKGROUND

Many computer games (including games created for personal computers and for gaming consoles) support some form of multiplayer gaming. Early in the history of gaming, multiplayer gaming was in the form of local multiplayer, in which a single copy of a game would receive inputs from multiple users and provide multiplayer features to those multiple users. For many games, these multiplayer features included a "split-screen" mode, in which a single copy or instance of a game would split a display presentation into a grid (e.g., rows and/or columns), with each portion of the grid being dedicated to facilitating a different user's perspective within a local multiplayer game session. Later, as personal computers and gaming consoles gained networking support, remote (i.e., network-based) multiplayer gaming experiences were created, in which different instances of a game would execute at different network-connected computing devices and cooperate to provide a single multiplayer game session to users at the different network-connected computing devices. Some games supported blended local and remote multiplayer experiences, in which at least one of the network-connected computing devices presented a split-screen experience to two or more users at that computing device, but also participated in a remote multiplayer game session with remote users.

As games became more complex, they became increasingly demanding on computing resources—with many game developers aiming to push the limits of available computing hardware with their new game releases. As a result, available computing hardware was unable to support "split screen" multiplayer modes for many games. For example, while available computing devices possessed sufficient processing and memory resources to support a single perspective of a multiplayer game session, those processing and memory resources were insufficient to simultaneously support multiple perspectives of the multiplayer game session. As a result, overtime, many game developers ceased implementing local split-screen multiplayer support in new game releases, while focusing on implementing remote multiplayer support (where each computing device only needed to support a single perspective of a multiplayer game session). As a result, many games developed in recent years include remote multiplayer support, but lack local multiplayer support.

BRIEF SUMMARY

At least some embodiments described herein provide a split-screen local multiplayer experience to a plurality of co-located users of a computer system, using remote multiplayer support of a multiplayer game which lacks or has limited local multiplayer support. For example, one or more embodiments include executing, at one or more computer systems, a plurality of instances of a multiplayer game. Embodiments also include generating and presenting a composite stream of these plurality of instances of the multiplayer game at a single display connected to a local computer system in a split-screen format, while routing inputs from each of a plurality of input devices connected to the local computer system to one of those instances of the multiplayer game. Remote multiplayer features of the multiplayer game are used to join a plurality of players associated with the plurality of instances of the multiplayer game to a single multiplayer session presented at a single display device. Thus, for co-located users of the local computer system, the multiplayer session is presented in manner that approximates a local split-screen multiplayer experience.

Accordingly, at least some embodiments herein add local split-screen multiplayer experiences to games that support only remote multiplayer experiences. In this way, these embodiments overcome technical limitations of many modern multiplayer games, which lack support of local split-screen multiplayer experiences.

In some embodiments, the plurality of instances of the multiplayer game are executed at the local computer system. In other embodiments, however, one or more of the plurality of instances of the multiplayer game (which can include up to all of the plurality of instances of the multiplayer game) are executed at one or more remote computer systems (e.g., a separate console device, a separate personal computer, a cloud gaming service, etc.), and streamed to the local computer system. When one or more game instances are executed remote from the local computer system, the local computer system is largely freed from the computational work associated with executing and rendering those game instance(s). By offloading game execution/rendering to remote computer system(s), at least some embodiments herein overcome the technical and hardware limitations that motivated the dropping of support for local split-screen multiplayer experiences games—that is, that a single computer system lacked sufficient processing and memory resources to support the execution and rendering of multiple perspectives of a multiplayer game session and by grouping the plurality of remote-running instances of the multiplayer game at the local computer system, no changes are required at the remote computer system (e.g. the remote computer system may be unaware that the games are being played by co-located users on a single local computing device).

In some embodiments, method, systems, and computer program products are directed to presenting a local multiplayer experience for a multiplayer game that lacks local multiplayer support. In these embodiments, a computer system establishes a plurality of game streams. Each game stream corresponds to a different instance of the multiplayer game, which includes remote multiplayer support, but which lacks local multiplayer support. Each game stream also corresponds to a different user identifier of a plurality of user identifiers. Each the plurality of user identifiers is joined to a single multiplayer session of the multiplayer game using the remote multiplayer support of the multiplayer game. The computer system also identifies a plurality of gaming interface devices connected to the one or more user input/output (I/O) interfaces. The computer system also associates each of the plurality of gaming interface devices with a different game stream of the plurality of game streams. The computer system also outputs to the display interface, a composite stream of the plurality of game streams that simultaneously includes each of the plurality of game streams in a split-screen display format for display at a single display device. While outputting the composite stream of the plurality of game streams, the computer system causes one or more input signals received from each of the plurality of gaming interface devices to be routed to its associated game stream. As described above, this means that the remote system is unaware that the user inputs for the different instances are all generated by gaming interface devices that are connected to a single local computer system.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
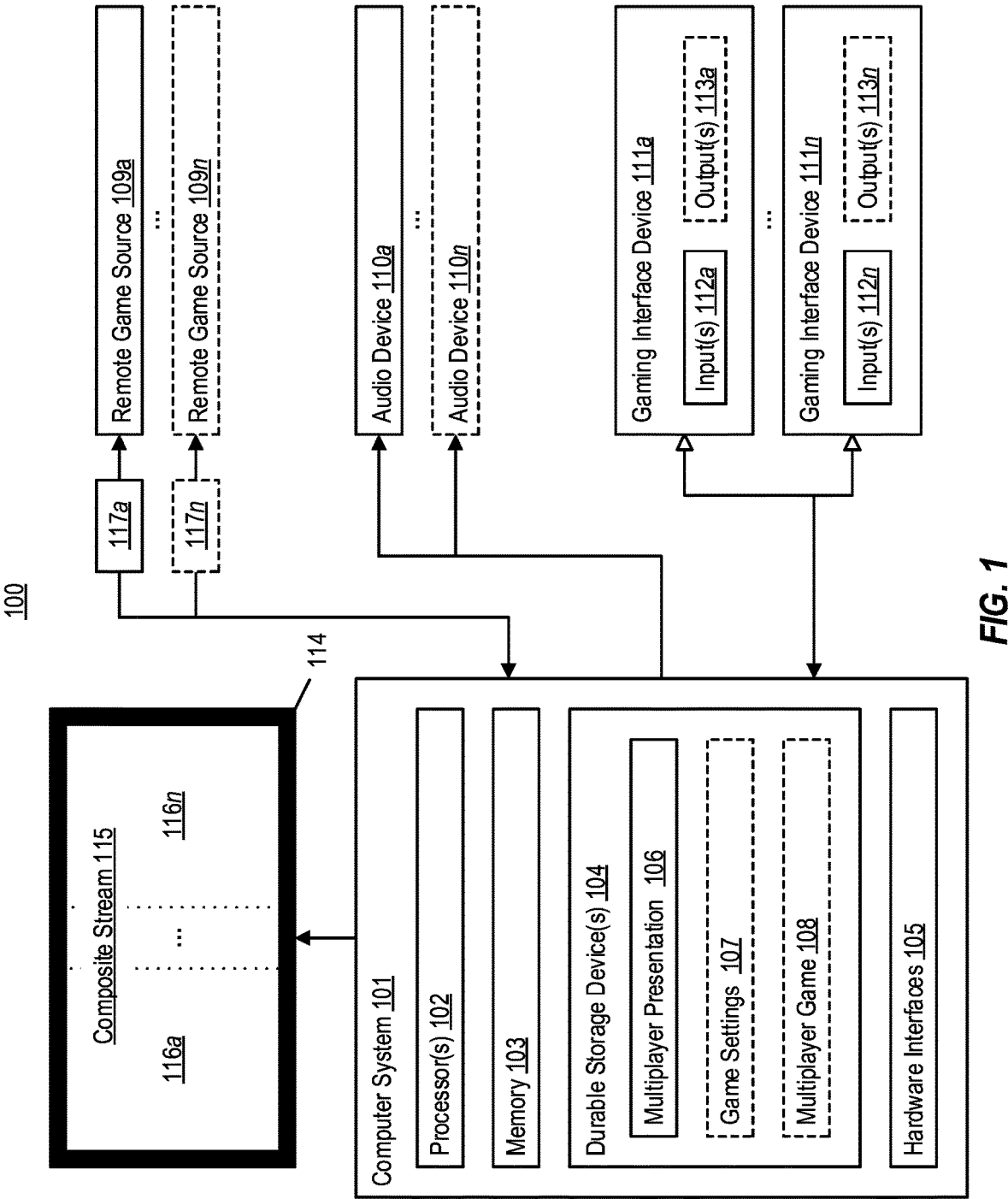
FIG. 1 illustrates an example computer architecture that facilitates presenting a local multiplayer experience to co-located users, for a multiplayer game that may lack local multiplayer support.

FIG. 1 illustrates an example computer architecture 100 that facilitates presenting a local multiplayer experience to co-located users, for a multiplayer game that may lack local multiplayer support. As shown, computer architecture 100 comprises a computer system 101. In some embodiments, the computer system 101 is a special-purpose gaming console, while in other embodiments the computer system 101 is a more general purpose personal computer. In general, and as will be described, the computer system 101 is configured to provide a split-screen local multiplayer experience to a plurality of co-located users of the computer system 101, using remote multiplayer support of a multiplayer game which may lack local multiplayer support.

As used herein, the term "local" means isolated to a given computing device (and its directly-connected peripherals). The term "local multiplayer experience" refers to a multiplayer experience provided to a plurality of co-located users of a single computing device, such as the computer system 101, including a split-screen local multiplayer game session. The term "local multiplayer support" refers to game feature(s) that implement a local multiplayer experience, thereby enabling a single copy of a game that executes at a single computing device to provide a local multiplayer game session to a plurality of co-located users.

As used herein, the term "remote" means remote from a given computing device (e.g., the computer system 101) over one or more networks, such as one or more Personal Area Networks (PANS), one or more Local Area Networks (LANs), one or more Wide Area Networks (WANs) such as the Internet, etc. The term "remote multiplayer experience" refers to a multiplayer experience provided to a plurality of users by a plurality of network-connected computing devices, such as remote multiplayer game session in which each user is presented a single perspective of the multiplayer game session by a different one of the plurality of network-connected computing devices. The term "remote multiplayer support" refers to game feature(s) that implement a remote multiplayer experience, thereby enabling a copy of a game that executes at a given computing device to provide one perspective of a multiplayer game session to one user, while also communicating over one or more networks with one or more other copies of the game that each executes at one or more remote computing devices, and that each provides an additional perspective of the multiplayer game session to an additional user.

As shown, the computer system 101 includes one or more processor(s) 102, memory 103, one or more durable storage device(s) 104, and one or more hardware interfaces 105. In embodiments, the processor(s) 102 comprises one or more central processing units (CPUs), one or more graphics processing units (GPUs), and the like. In embodiments, durable storage device(s) 104 comprise one or more hard disk drives (HDDs), one or more solid-state drives (SSDs), one or more optical media (e.g., CD-ROM, DVD, BLU-RAY, etc.), one or more programmable read-only memory (PROM) chips, and the like. The hardware interfaces 105 represent any type of hardware interface used by the computer system 101 to interact with peripheral devices and other computer systems, and in embodiments the hardware interfaces 105 comprise one or more user I/O interfaces, one or more display interfaces, one or more audio interfaces, one or more network communications interfaces, and the like.

In FIG. 1, the computer system 101 is communicatively coupled to a display device 114, such as a computer monitor, a television, a projector, and the like. In embodiments, the computer system 101 is communicatively coupled to the display device 114 using at least one display interface of the hardware interfaces 105. While the display device 114 is illustrated as being a peripheral of the computer system 101, in some embodiments the display device 114 is integral to the computer system 101; in either case, some embodiments consider the display device 114 be a component of the computer system 101.

In FIG. 1, the computer system 101 is also communicatively coupled to one or more audio devices 110 (i.e., audio device 110*a* to audio device 110*n*), such as an audio component of display device 114, one or more headsets, a home theater system, and the like. In embodiments, the computer system 101 is communicatively coupled to the one or more audio devices 110 using at least one audio interface of the hardware interfaces 105. While the audio device(s) 110 are illustrated as being peripheral to computer system 101, in some embodiments one or more of the audio devices 110 are integral to computer system 101; in either case, some embodiments consider the audio device(s)s 110 to be component(s) of computer system 101.

In FIG. 1, the computer system 101 is also communicatively coupled to a plurality of gaming interface devices 111 (i.e., gaming interface device 111*a* to gaming interface device 111*n*). In embodiments, the computer system 101 is communicatively coupled to the one or more gaming interface devices 111 using at least one user I/O interface of the hardware interfaces 105. While the gaming interface devices 111 are illustrated as being peripheral to computer system 101, in some embodiments one or more of the gaming interface devices 111 are integral to computer system 101; in either case, some embodiments consider the gaming interface devices 111 to be component(s) of computer system 101. In embodiments, each gaming interface device 111 corresponds to a different human player (i.e., user of the computer system 101). In some embodiments, each gaming interface device 111 in FIG. 1 is a single hardware device, such as a single-component game controller. In other embodiments, each gaming interface device 111 in FIG. 1 is a set of two or more hardware devices that operate to receive input from a single player. In one example, one set of hardware devices comprises a keyboard and a mouse. In another example, one set of hardware devices comprises a multi-component game controller that comprises two or more physically distinct components that operate in concert, such as a separate remote and nunchuck, a separate gamepad and motion sensor, a separate gamepad and optical sensor (or emitter), and the like. Accordingly, any reference to "a" gaming interface device 111 or "each" gaming interface device 111 can refer to a set of two or more related hardware devices.

As shown, each gaming interface device 111 comprises one or more inputs 112 (i.e., input(s) 112*a* in gaming interface device 111*a* and input(s) 112*n* in gaming interface device 111*n*). In embodiments, these input(s) 112 comprise hardware input mechanisms (e.g., of a keyboard, a mouse, a gaming controller, and the like). In various examples, the input(s) 112 comprise one or more keys, one or more buttons, one or more switches, one or more joysticks, one or more touch-sensitive surfaces, one or more optical sensors, one or more microphones, and the like.

As shown, in some embodiments one or more of the gaming interface devices 111 also comprises one or more outputs 113 (i.e., output(s) 113*a* in gaming interface device 111*a* and output(s) 113*n* in gaming interface device 111*n*). In embodiments, these output(s) 113 comprise output mechanisms such as one or more haptic feedback devices, one or more light-emitting diodes (LEDs), audio devices (e.g., one or more headphone jacks, one or more wireless audio interfaces, one or more speakers, etc.), and the like. In embodiments, when an output 113 comprises an audio output, this output 113 is one of the audio device(s) 110.

In embodiments, the durable storage device(s) 104 store computer-executable instructions that are executable by at least one of the processor(s) 102 to facilitate operation of the computer system 101. Although not illustrated, in embodiments the durable storage device(s) 104 store computer-executable instructions corresponding to an operating system (OS), or other instructions (e.g., as part of a BIOS, UEFI, etc.) that are used to boot the computer system 101.

The durable storage device(s) 104 are shown as storing a local multiplayer presentation component 106 (presentation component 106). In general, the presentation component 106 establishes a plurality of game streams, each corresponding to a different instance of a multiplayer game (which includes remote multiplayer support, but which may lack local multiplayer support). Then, in some embodiments, the local presentation component 106 generates a new composite stream from the plurality of game streams. In other embodiments, a remote presentation component (e.g., presentation component 106', discussed later) generates the new composite stream and communicates that composite stream to the local presentation component 106, which then presents the remotely-generated composite stream at the display device 114. Whether generated locally or remotely, this new composite stream arranges the individual game streams into a split-screen display format. While presenting this composite stream at the display device 114, the presentation component 106 routes user inputs from each of the gaming interface devices 111 to an associated game stream. While presenting this composite stream at the display device 114, the presentation component 106 also routes audio output from one or more of the game streams to the audio device(s) 110.

In some embodiments, each of the game streams is engaged in a single multiplayer session of the multiplayer game, using the remote multiplayer support of the multiplayer game. As such, the presentation component 106 uses the remote multiplayer support of the multiplayer game to present a local split-screen multiplayer experience at the computer system 101—even when the multiplayer game lacks local multiplayer support. In alternate embodiments, at least a first of the game streams is engaged in a multiplayer session of the multiplayer game using local multiplayer support of the multiplayer game, and at least a second of the game streams is engaged in the multiplayer session of the multiplayer game using remote multiplayer support of the multiplayer game. In these alternate embodiments, the presentation component 106 uses the remote multiplayer support of the multiplayer game to enable a greater number of co-located players to engage in a local multiplayer experience than is supported by the local multiplayer support of the multiplayer game. In either embodiment, in FIG. 1, a local split-screen multiplayer experience is shown on display device 114 as a composite stream 115, which includes a plurality of game streams 116 (i.e., game stream 116*a* to game stream 116*n*) arranged into a composite grid-like pattern. In embodiments, the presentation component 106 uses the remote multiplayer support of a game to create or extend a local split-screen multiplayer experience for the game without any modification to the game, itself. As such, the presentation component 106 is generically operable with a variety of un-modified multiplayer games, in order to create or extend local split-screen multiplayer experiences for those games.

As mentioned, the presentation component 106 establishes a plurality of game streams, each corresponding to a different instance of a multiplayer game. In some embodiments, one or more of these game streams corresponds to one or more game instances executing at the computer system 101; as such, the durable storage device(s) 104 are also shown as potentially storing computer-executable instructions and data for at least one copy of a multiplayer game 108, at least one instance of which executes at the computer system 101 (e.g., using processor(s) 102 and memory 103). In some embodiments, each copy of the multiplayer game 108 is restricted (e.g., by licensing) to support execution of only a single running instance, and the durable storage device(s) 104 store multiple copies of the multiplayer game 108, which are used to support execution of multiple instances of the multiplayer game 108 at the computer system 101. In some embodiments, the multiplayer game 108 is remote only, meaning that it includes remote multiplayer support, but lacks local multiplayer support (i.e., the multiplayer game 108 is itself incapable providing a local split-screen multiplayer experience).

In additional, or alternative, embodiments, one or more of these game streams corresponds to one or more game instances executing at one or more remote game sources 109 (i.e., remote game source 109a to remote game source 109n); thus, FIG. 1 shows one or more remote game streams 117 (i.e., remote game stream 117a to remote game stream 117n) communicated between the computer system 101 and the remote game source(s) 109.

Figure 2:
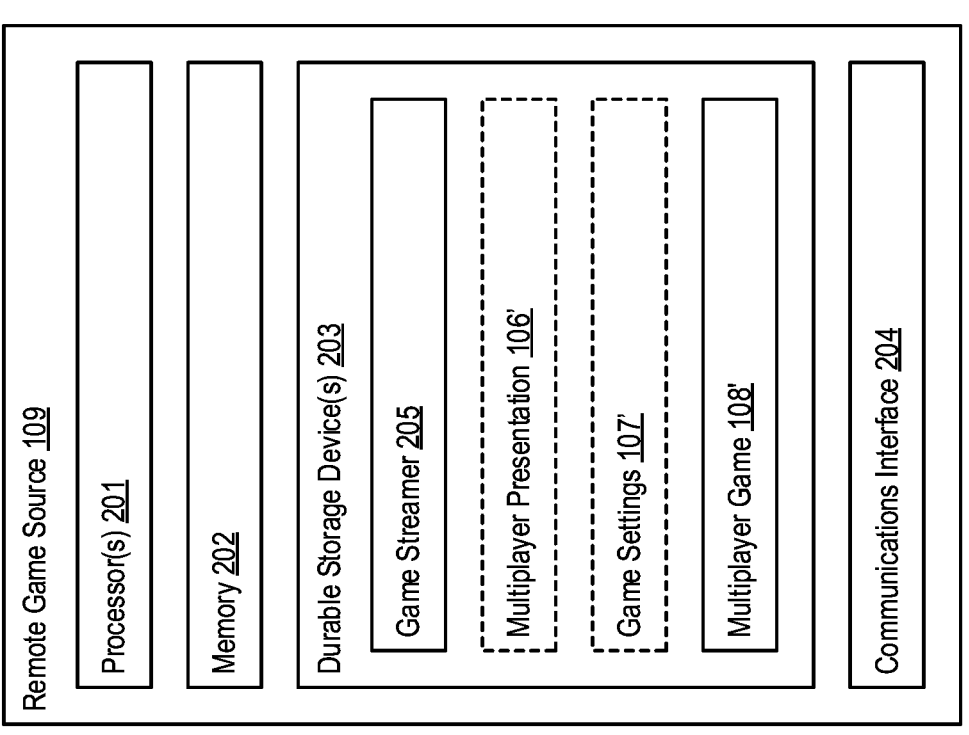
FIG. 2 illustrates details of a remote game source computer system, according to one or more embodiments.

FIG. 2 illustrates additional details of one of the remote game source(s) 109, according to one or more embodiments. As shown, each remote game source 109 is a computer system that comprises one or more processor(s) 201 (e.g., CPU(s), GPU(s), etc.), memory 202, durable storage device(s) 203, and at least one network communications interface 204. Each remote game source 109 can take a variety of forms, such as a gaming console device, a personal computer, or a server (e.g., cloud service computer system).

The durable storage device(s) 203 are illustrated as storing a game streamer component 205 and one or more copies of the multiplayer game 108 (shown as multiplayer game 108') described in connection with FIG. 1. The game streamer component 205 streams (i.e., over the network communications interface 204) one or more instances of the multiplayer game 108 that execute at the remote game source 109 (i.e., using the processor(s) 201 and the memory 202). In embodiments, this streaming includes exporting a video stream and an audio stream to the network communications interface 204, and receiving user inputs from the network communications interface 204. As shown, in some embodiments, the durable storage device(s) 203 also store a local multiplayer presentation component 106' (presentation component 106'), which includes a least a portion of the functionality of the presentation component 106 of FIG. 1. Thus, it will be appreciated that in various embodiments functionality of the presentation component 106 is carried out by one, or both, of the presentation component 106 at the computer system 101 or a presentation component 106' at remote game source(s) 109. As such, any description of presentation component 106 is applicable to presentation component 106'.

Figure 3:
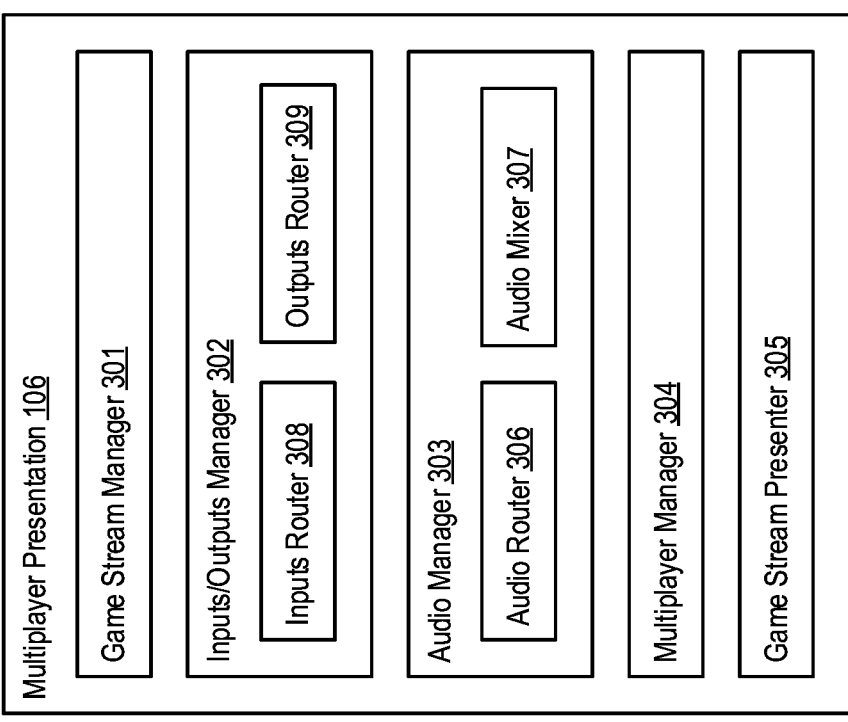
FIG. 3 illustrates details of a local multiplayer presentation component, according to one or more embodiments.

FIG. 3 illustrates additional details of the presentation component 106, according to one or more embodiments. As illustrated, the presentation component 106 comprises a variety of components (i.e., a game stream manager 301, an inputs/outputs manager 302, an audio manager 303, a multiplayer manager 304, and a game stream presenter 305) that represent functions that the presentation component 106 implements in accordance with various embodiments described herein. It will be appreciated that the depicted components—including their identity, sub-components, and arrangement—are presented merely as an aid in describing various embodiments of the presentation component 106 described herein, and that these components are non-limiting to how software and/or hardware might implement various embodiments of the presentation component 106 described herein, or of the particular functionality thereof.

The game stream manager 301 establishes and manages a plurality of game streams, each corresponding to a different instance of the multiplayer game 108. In embodiments, the game stream manager 301 establishes one or more local game streams corresponding to one or more instance(s) of the multiplayer game 108 executing at the computer system 101. In embodiments, the game stream manager 301 additionally, or alternatively, establishes one or more remote game streams 117 corresponding to instance(s) of the multiplayer game 108 executing at the remote game source(s) 109. In some embodiments, the game stream manager 301 at the presentation component 106 cooperates with game stream manager(s) 301 at one or more remote presentation component(s) 106' to establish and/or manage at least one game stream. In embodiments, each game stream comprises once or more downstream data channels (e.g., game video, game audio, haptic feedback data, etc.), as well as one or more upstream data channels (e.g., user inputs, voice chat data, etc.).

The inputs/outputs manager 302 identifies the gaming interface devices 111 (e.g., corresponding to each player), and associates each of the gaming interface devices 111 with one of plurality of game streams. In some embodiments, the inputs/outputs manager 302 maps each gaming interface device 111 to a different one of the plurality of game streams, so that there is a 1:1 correspondence between gaming interface devices 111 and game streams. In other embodiments, the inputs/outputs manager 302 maps two or more gaming interface device 111 with a single game stream, so that there is a N:1 correspondence between gaming interface devices 111 and game streams (i.e., so that two or more players are associated with a single game stream, or two devices used by a single player are associated with a single game stream, etc.). The inputs/outputs manager 302 manages inputs received from the gaming interface devices 111 (i.e., input(s) 112) and any outputs sent by a game to the gaming interface devices 111 (i.e., output(s) 113). For example, on the identified associations, the an inputs router 308 routes any inputs received from each gaming interface device 111 to its associated game stream, and an outputs router 309 routes any outputs generated by each gaming stream (e.g., LED outputs, rumble pack outputs, etc.) to its associated gaming interface device 111.

The audio manager 303 manages output of audio from the plurality of game streams to the audio device(s) 110. As will be appreciated, each game stream would typically have a corresponding audio stream, and thus there are a plurality of audio streams corresponding to the plurality of game streams. The illustrated embodiment of the audio manager 303 includes an audio router 306 and audio mixer 307, which operate to route and/or mix these audio streams to the audio device(s) 110. In embodiments, the particular manner of this routing/mixing varies depending on a number of available audio device(s) 110, the richness of information available within the audio streams, implementation choices, and the like.

In some configurations, there is a single audio device 110a, such as an audio component of the display device 114 or a home theater system. In embodiments, when a single audio device configuration is present, the audio mixer 307 mixes the plurality of audio streams together into a combined audio stream, and the audio router 306 routes this combined audio stream to the audio device 110a.

In other configurations, there are a plurality of audio devices 110, each corresponding a different player (e.g., as headsets, as audio devices within gaming controllers, etc.). In embodiments, when an audio device is present for each player, the audio router 306 associates each audio stream with a different audio device 110, and individually routes those audio streams to their associated audio device 110.

Additional configurations may present a mixed audio environment, in which there are a plurality of audio devices 110, one or more of which is individually associated with a corresponding individual player (e.g., a headset, an audio device within a gaming controller, etc.), and one or more of which is associated with a plurality of players (e.g., an audio component of the display device 114, a home theater system, etc.). In embodiments, when a mixed audio environment is present, the audio router 306 and the audio mixer 307 operate to route audio that is "common" to the audio streams—such as a music track—to an audio device associated with a plurality of players, and route audio that is "individual" to an appropriate audio device while potentially "subtracting" (i.e., reducing or removing) the common audio.

In one audio mixing and routing example, the audio mixer 307 identifies a commonality between a plurality of audio steams, such as a music track played by each of the audio steams. In embodiments, the audio mixer 307 subtracts this commonality from an audio stream (if any) that is to be routed by the audio router 306 to an audio device associated with an individual player (e.g., a headset, a controller audio device, etc.), but preserves this commonality in an audio stream that is to be routed by the audio router 306 to an audio device associated with more than one player (e.g., a display device, a home theater system, etc.).

In some embodiments, the audio mixer 307 identifies a commonality (e.g., a background music track and/or a menu sound effect) between audio steams, even if that commonality is not actually present among all the audio steams at the same time, or is time-shifted among the audio streams. In one example, the audio mixer 307 identifies a music track as being common between audio streams, even if that music track is not synchronized among the audio streams. Thus, in this example, the audio mixer 307 can subtract a music track from an audio stream that is routed by the audio router 306 to an audio device that is associated an individual player, even when music tracks are not perfectly in sync with a music track being routed by the audio router 306 to an audio device associated with more than one player. Additionally, in this example, the audio mixer 307 can subtract all but on instance of the commonality from audio streams that are mixed and routed by the audio router 306 to an audio device that is associated one or more players. In another example, the audio mixer 307 identifies a plurality of different music tracks that can be common between audio streams (e.g., a library of possible music tracks identified using machine learning or other categorization techniques), and performs subtraction even when different music tracks are being played in different audio streams at the same time. Thus, in this example, the audio mixer 307 can subtract a first music track from an audio stream that is routed by the audio router 306 to an audio device that is associated an individual player, even when the first music track is different from a second music track being routed by the audio router 306 to an audio device associated with more than one player. In embodiments, the audio mixer 307 identifies a known commonality (e.g., background music, menu sound effect, etc.) with respect to a single audio stream, and applies a subtraction of that commonality to that single audio stream, even when the commonality is not actually present in any other audio stream.

In another audio mixing and routing example (which is combinable with identifying and subtracting commonalities), the audio mixer 307 mixes unique audio from audio tracks that are being routed by the audio router 306 to an audio device associated with more than one player (e.g., a display device, a home theater system, etc.), without mixing unique audio from audio tracks that are being routed by the audio router 306 to audio devices associated with individual players (e.g., a headset, a controller audio device, etc.). Thus, in this example, individual player sound effects for players using a common audio device are mixed, while individual player sound effects for players using personal audio devices are not mixed. In embodiments, the audio manager 203 detects one or more "individual" audio device(s) that correspond to individual users, and one or more "common" audio device(s) that correspond to a plurality of users. In examples, the audio manager 203 detects a particular audio device 110 as being an "individual" audio device when the audio device is an output 113 of a gaming interface device 111, when the audio device 110 is assigned to either an individual game stream or to an individual user, or when the audio device 110 is detected to be a hardware type that typically corresponds to individual use (e.g., a BLUETOOTH headset, a headset attached to a gaming interface device, a personal computing device such as a tablet or mobile phone, and the like). In examples, the audio manager 203 detects a particular audio device 110 as being a "common" audio device when the audio device is assigned to two or more individual game streams or to two or more users, or when the audio device 110 is detected to be a hardware type that could correspond to multi-user use (e.g., a display speaker, a wireless speaker, a home theater receiver, and the like).

In some embodiments, one or both of the audio router 306 or the audio mixer 307 determine which portion(s) of audio to mix, and/or which portion(s) of audio to route, based on different audio channels in a multi-channel audio stream. In additional, or alternative embodiments one or both of the audio router 306 or the audio mixer 307 determine which portion(s) of audio to mix, and/or which portion(s) of audio to route, based on identifying particular audio objects in object-based sound formats, such as DOLBY ATMOS and DTS:X, and the like.

Figure 4:
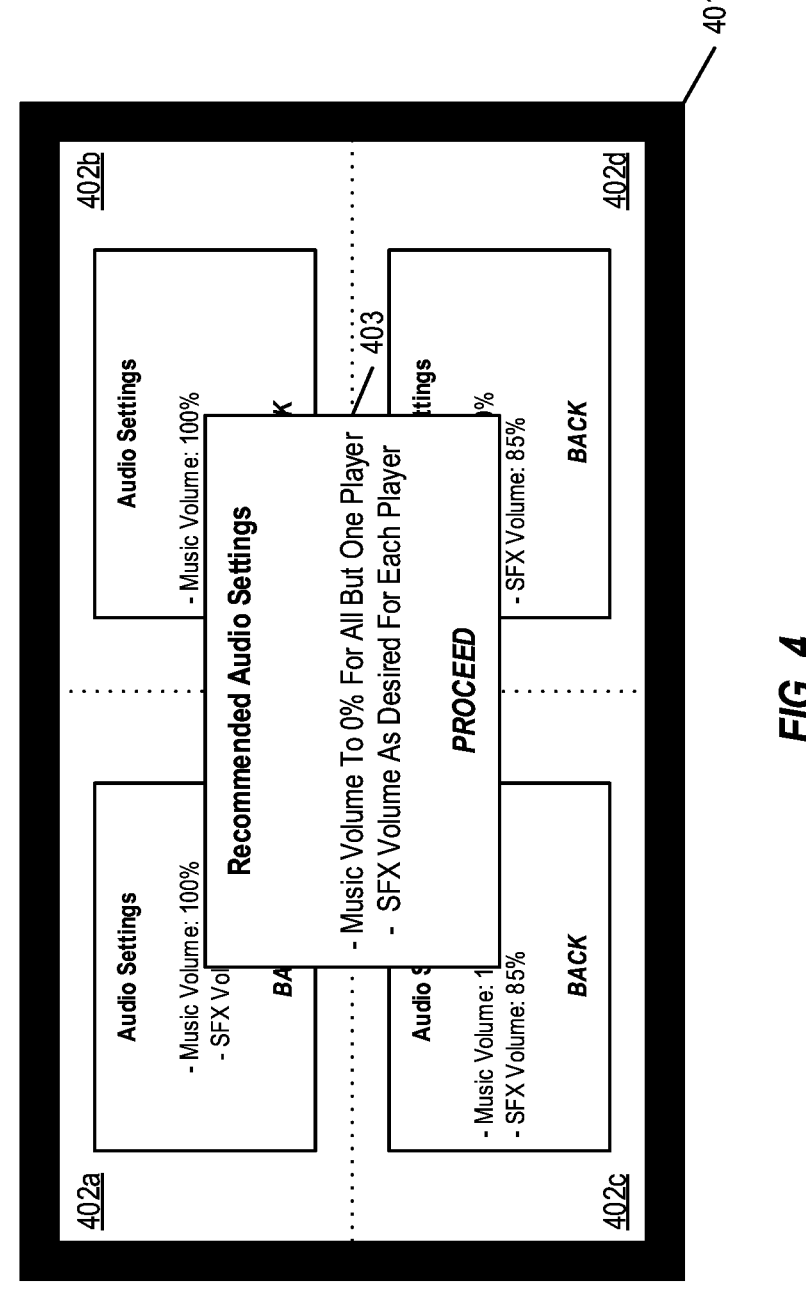
FIG. 4 illustrates an example of providing suggested audio settings, according to one or more embodiments.

In some embodiments, the audio manager 303 provides suggested audio settings, such as to mute a music track in all but one game stream, while playing sound effects in the other game streams. For example, FIG. 4 illustrates an example of providing suggested audio settings, according to one or more embodiments. In particular, FIG. 4 illustrates an example 400 in which a display device 401 displays a split-screen local multiplayer presentation that includes four game streams 402a-402d arranged into a grid. In example 400, the display device 401 also displays a message dialog 403 (e.g., initiated by the audio manager 303) that suggests that the music volume should be muted (0%) for all but one player, and the sound effects (SFX) volume should be set as desired for each player. In embodiments, the suggestion in the message dialog 403 is customized per-game.

In some embodiments, the audio manager 303 automatically adjusts audio settings within each of the plurality of game streams. For example, the durable storage device(s) 104 in FIG. 1 are shown as potentially storing game settings 107, while the durable storage device(s) 203 in FIG. 2 are shown as potentially storing game settings 107'. In embodiments the game settings 107/107' are applicable to the multiplayer game 108, and the audio manager 303 automatically adjusts audio settings in one or both of the game settings 107/107'. In embodiments, the particular audio settings are customized per-game. In some embodiments, a game may obtain audio settings that are stored in association with a user account, and audio manager 303 the adjusts audio settings within that user account.

As discussed, the presentation component 106 enables a local split-screen multiplayer experience of a multiplayer game by creating a composite view of a plurality of game streams—where each game stream corresponds to a locally or remotely-executing instance of the multiplayer game. In embodiments, this local split-screen multiplayer experience is enabled using remote multiplayer support of the multiplayer game, possibly in combination with local multiplayer support of the multiplayer game. In embodiments, each instance of the multiplayer game is associated with one or more players (e.g., a single player when an instance uses remote multiplayer support, two or more players when an instance uses local multiplayer support, etc.). As such, each game stream is associated with one or more user identifiers, each associated with a different player. In some embodiments, each user identifier corresponds to a different account on one or more gaming services. Additionally, or alternatively, at least one user identifier corresponds to a guest account, such as a temporary account that is derived from a "parent" account on a gaming service. In one example, the same user account (e.g., "USERNAME") is used multiple times across one or more game streams (e.g., as user identifiers USERNAME, USERNAME(2), USERNAME (3), and so on).

In some embodiments, individual players using the computer system 101 utilize the multiplayer features of the multiplayer game 108 to manually join one or both of a multiplayer lobby or a multiplayer game session. In one example, each player uses one of the gaming interface devices 111 to input a user identifier (and any additional information, such as a password) for a game stream established by the game stream manager 301, to navigate to a multiplayer lobby of the multiplayer game 108, to search for the other players that will participate in the split-screen local multiplayer experience provided by the presentation component 106, and to initiate a multiplayer game session.

In additional, or alternative, embodiments the multiplayer manager 304 facilitates the process of joining players to a multiplayer game session. In some embodiments, the multiplayer manager 304 stores user information (e.g., user identifiers, passwords, etc.) for one or more players, and automatically enters this user information for one or more of the game streams established by the game stream manager 301. In additional, or alternative, embodiments the multiplayer manager 304 automatically joins players associated with the game streams established by the game stream manager 301 into a multiplayer lobby of the multiplayer game 108 and/or starts a multiplayer session of the multiplayer game 108 with these players.

In one embodiment, the multiplayer manager 304 determines which players to join to a multiplayer lobby and/or multiplayer session based on those players having interacted with game streams via the presentation component 106 (e.g., by using the gaming interface devices 111 to enter their user identifiers/passwords). In another embodiment, the multiplayer manager 304 facilitates joining players to a multiplayer lobby and/or multiplayer session based on game instances associated with those player's user identifiers operating on a common network. In one example, one or more multiplayer managers 304 operating at one or more remote game source(s) 109 ensure that a plurality of instances of the multiplayer game 108 operate within a common network by ensuring that they operate on the same LAN segment (e.g., using virtualized networking, VLAN tagging, etc.), that they operate on the same Internet Protocol (IP) subnet, etc. In some embodiments, these instances of the multiplayer game 108 then discover one another using local network discovery mechanisms-such as IP broadcast or IP multicast—and use that discovery to join associated players to a multiplayer lobby and/or multiplayer game session. In another embodiment, the multiplayer manager 304 uses discovery that multiple instances of the multiplayer game 108 are operating on a common network as a hint to automatically join associated users to a multiplayer lobby or game session.

Figure 5:
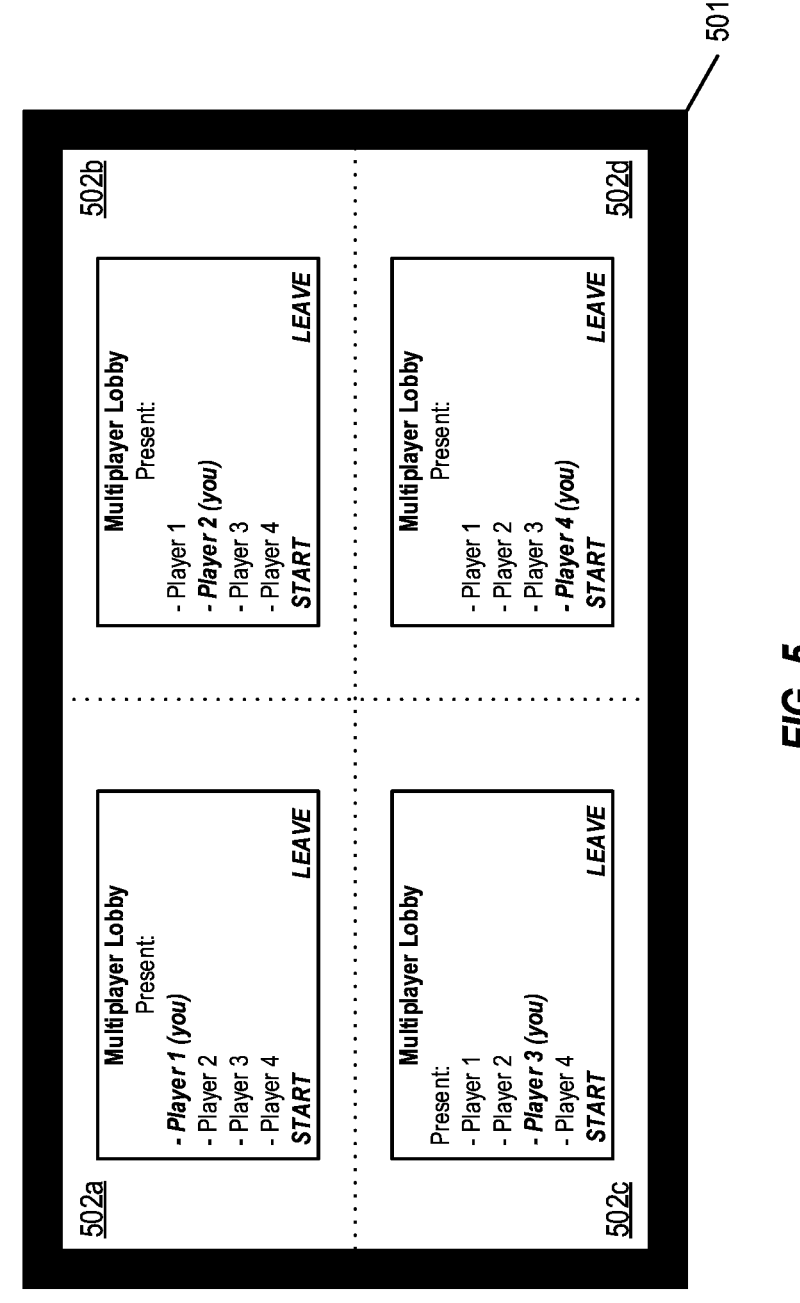
FIG. 5 illustrates an example of use of remote multiplayer features to create a local multiplayer experience.

Regardless of whether players are joined manually or automatically, FIG. 5 illustrates an example of use of remote multiplayer features to create a local multiplayer experience. In particular, FIG. 5 shows an example 500 in which a display device 501 displays a split-screen local multiplayer presentation that includes four game streams 502a-502e arranged into a grid, and in which each game stream shows corresponding players joined to a multiplayer lobby.

The game stream presenter 305 generates and outputs a composite stream 115 for display at the display device 114. In embodiments, the game stream presenter 305 generates a composite stream 115 that is formatted to be displayed at a single display device (i.e., display device 114), while simultaneously including each of the plurality of game streams. Thus, in embodiments, the game stream presenter 305 generates a composite stream 115 having a split-screen display format (e.g., by arranging the game streams in a grid-like format). In embodiments, the game stream presenter 305 scales one or more of the pixel dimensions (i.e., height and/or width) of the video frames of at least one game stream in order to generate the split-screen display format. In embodiments, this scaling adjusts one or more of a pixel resolution or an aspect ratio of those video frames.

In some embodiments, the game stream presenter 305 arranges one or more of the plurality of game streams within the composite stream 115 in a manner that is at least partially associated with the physical location(s) of one more of the co-located players (e.g., based on detecting a position of one or more of the gaming interface devices 111 acoustically, optically, and/or via radio communications). For example, recent revisions to the BLUETOOTH wireless communications standard provide directional notification for a wireless radio connection. In this example, if one or more of the gaming interface devices 111 supports directional notifications under the BLUETOOTH standard, the game stream presenter 305 detects a position of these gaming interface device(s) 111 (e.g., relative to the computer system 101, relative to the display device 114, relative to one or more other gaming interface device(s) 111, etc.) using radio communications, and determines a placement of game streams corresponding to those gaming interface device(s) 111 within the composite stream 115 based on these relative position(s). As a simple example, for a 2×2 grid of four game streams each with one corresponding player, the two grid locations located to the left of the screen may be assigned to, and based on, the two players furthest to the left of the display or gaming console (e.g., computer system 101). In yet another example, for a 4 wide×3 high grid of twelve game streams each with a corresponding player, the bottom three grid locations may be assigned to, and based on, the three players closest to the display or gaming console (e.g., computer system 101).

Figure 7:
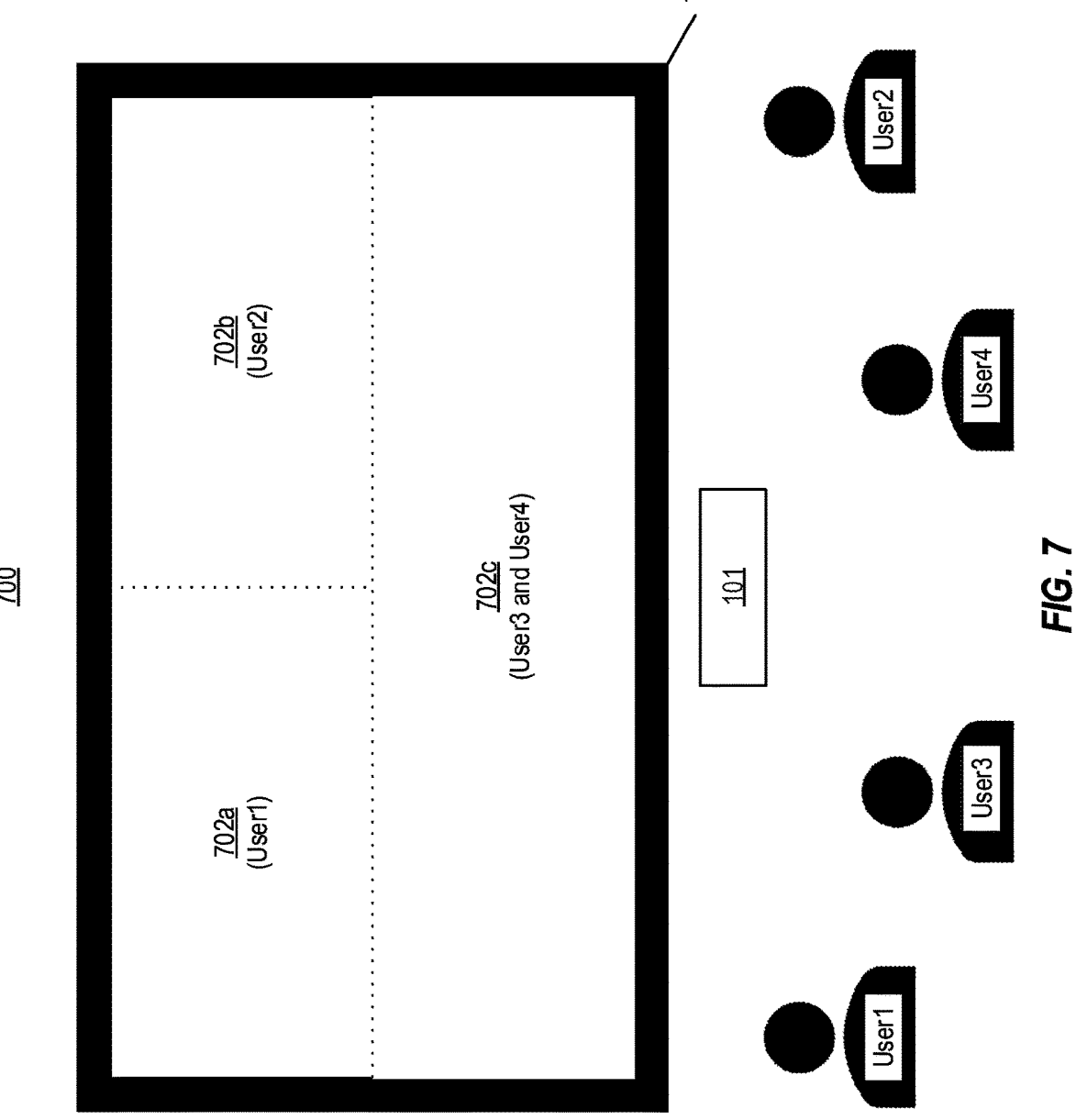
FIG. 7 illustrates an example in which a plurality of players are co-located around a computer system, with a composite stream being displayed at a display.

In a more particular example, FIG. 7 illustrates an example 700 in which a plurality of players (i.e., User1, User2, User3, and User4) are co-located around computer system 101, with a composite stream being displayed at a display 701. Here, the composite stream includes three game streams 702a-702c. In particular, a first game stream 702a is associated with User1 (e.g., using remote multiplayer features of the multiplayer game 108) and occupies a top-left portion of the display 701, a second game stream 702b is associated with User2 (e.g., using remote multiplayer features of the multiplayer game 108) and occupies a top-right portion of the display 701, and a third game stream 702c is associated with both User3 and User4 (e.g., using both local split-screen multiplayer features and remote multiplayer features of the multiplayer game 108) and occupies a bottom portion of the display 701. In example 700, these game streams 702a-702c are arranged to generally correspond to the physical position of the players relative to the computer system 101.

Figure 8:
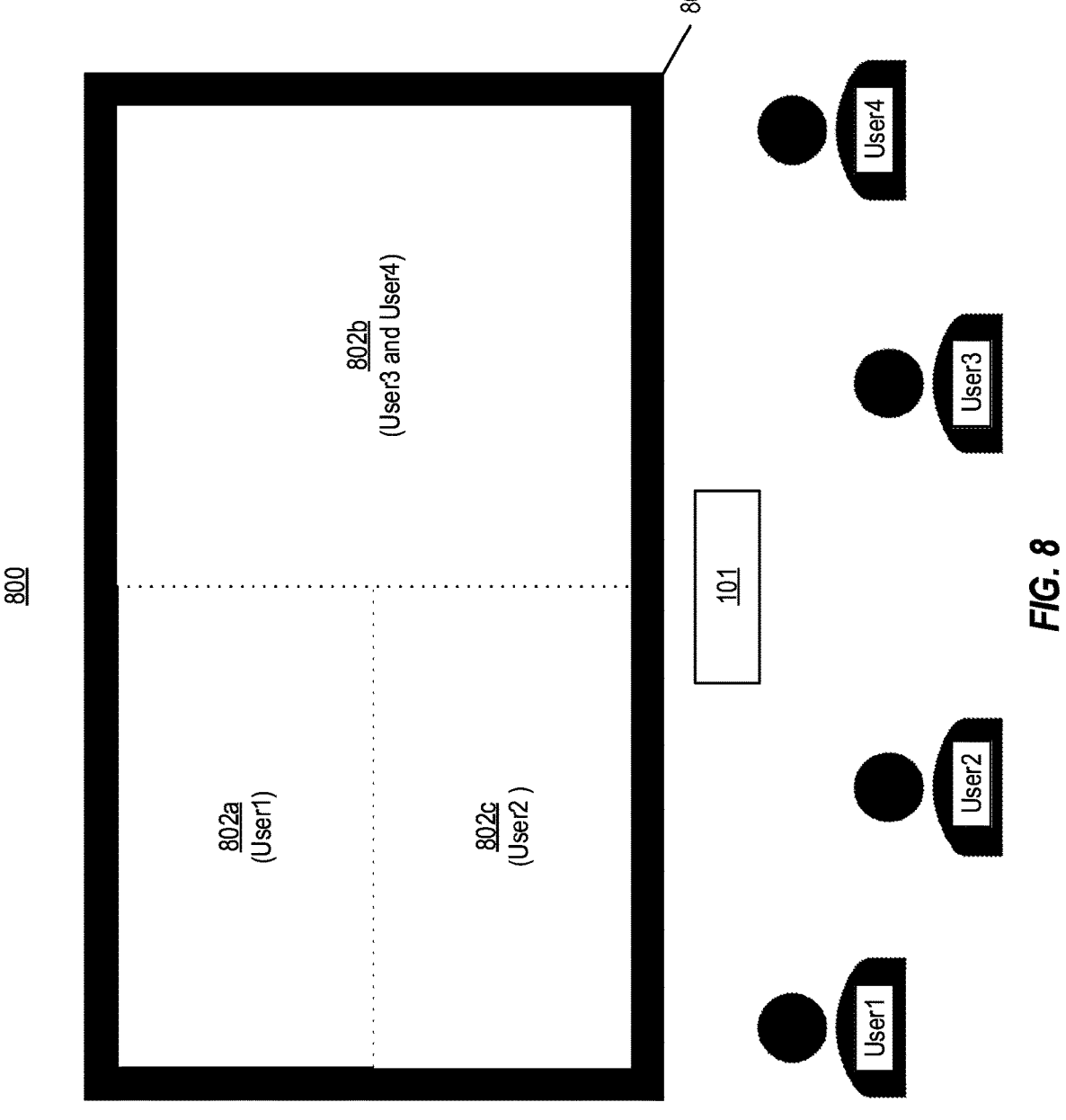
FIG. 8 illustrates an example in which a plurality of players are co-located around a computer system, with a composite stream being displayed at a display.

In another more particular example, FIG. 8 illustrates an example 800 in which a plurality of players (i.e., User1, User2, User3, and User4) are co-located around computer system 101, with a composite stream being displayed at a display 801. Here, the composite stream also includes three game streams 802a-802c. In particular, a first game stream 802a is associated with User1 (e.g., using remote multiplayer features of the multiplayer game 108) and occupies a top-left portion of the display 801, a second game stream 802b is associated with User2 (e.g., using remote multiplayer features of the multiplayer game 108) and occupies a bottom-left portion of the display 801, and a third game stream 802c is associated with both User3 and User4 (e.g., using both local split-screen multiplayer features and remote multiplayer features of the multiplayer game 108) and occupies a right portion of the display 801. In example 800, these game streams 802a-802c are also arranged to generally correspond to the physical position of the players relative to the computer system 101.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 6:
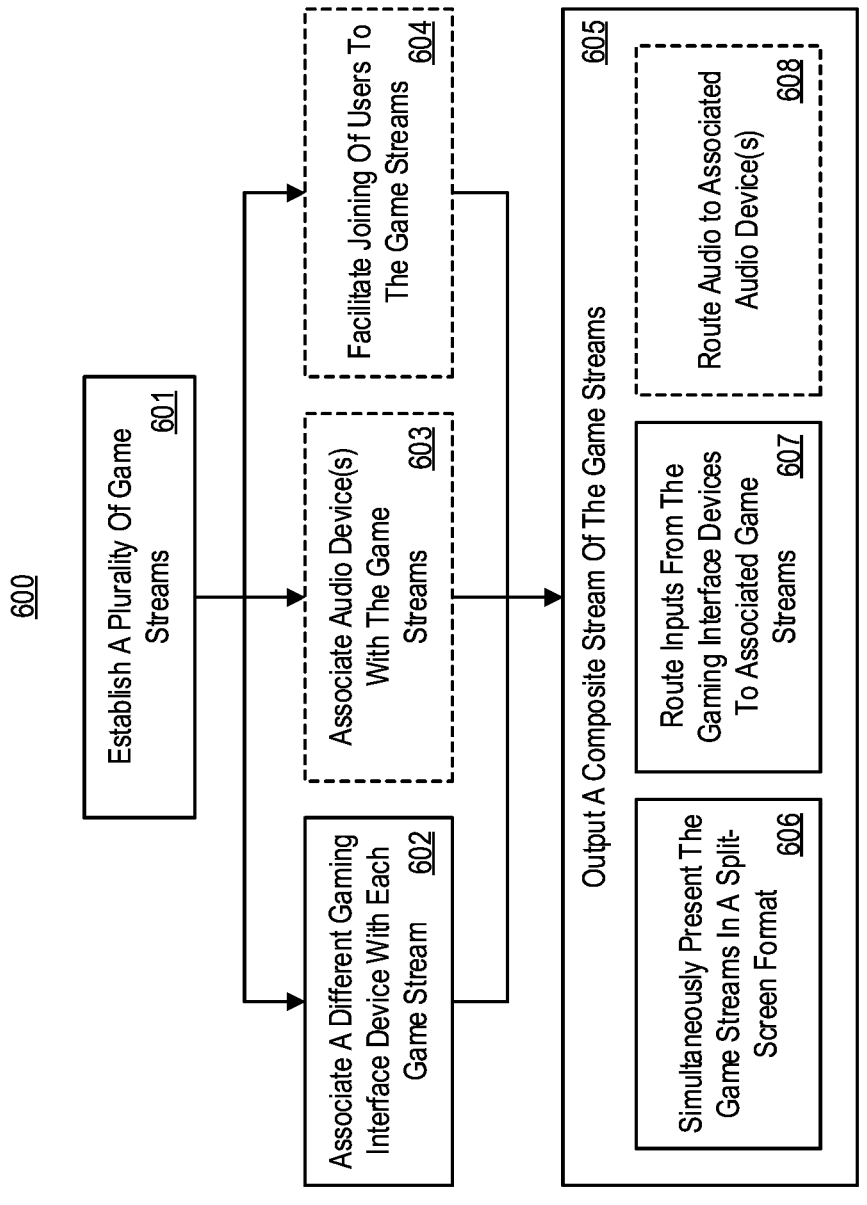
FIG. 6 illustrates a flow chart of an example method for presenting a local multiplayer experience for a multiplayer game that lacks local multiplayer support.

FIG. 6 illustrates a flow chart of an example method 600 for presenting a local multiplayer experience for a multiplayer game. In some embodiments, method 600 presents a local multiplayer experience for a multiplayer game that lacks local multiplayer support. In other embodiments, method 600 uses a game's remote multiplayer support to increase a number of co-located players that can participate in a local multiplayer experience beyond those supported by the game's local multiplayer support. Method 600 will be described with respect to the components and data of computer architecture 100.

Method 600 comprises an act 601 of establishing a plurality of game streams. In some embodiments, act 601 comprises establishing a plurality of game streams, in which each game stream corresponds to a different instance of the multiplayer game. In some embodiments, the multiplayer game includes remote multiplayer support, but lacks local multiplayer support. In other embodiments, the multiplayer game includes both remote multiplayer support and local multiplayer support. In an example, the game stream manager 301 at the presentation component 106 executing at the computer system 101 establishes a plurality of game streams. Each game stream corresponds to a different instance of the multiplayer game 108, which includes remote multiplayer support, but which may lack local multiplayer support.

In some embodiments, these game streams include one more local game streams (i.e., executing at the computer system 101). Thus, in embodiments, at least one of the plurality of game streams corresponds to a particular instance of the multiplayer game that executes at the computer system. In embodiments, including local game stream(s) provides a technical benefit of leveraging local computing resources of the computer system 101 for supporting at least one instance of the multiplayer game that is part of a multiplayer game session, and reduces a dependence on remote computing resources and/or use of network resources. In additional, or alternative, embodiments these game streams include one more remote game streams 117 executing at one or more of the remote game source(s) 109. Thus, in embodiments, at least one of the plurality of game streams corresponds to a particular instance of the multiplayer game that executes at a remote computer system. In embodiments, this remote computer system is one of a gaming console device, a personal computer, or a cloud service computer system. In embodiments, when the game streams include one or more remote game streams 117, the game stream manager 301 at the presentation component 106 cooperates with one or more game stream managers at one or more remote presentation components 106'. In embodiments, including remote game stream(s) provides a technical benefit of leveraging remote computing resources for supporting at least one instance of the multiplayer game that is part of the multiplayer game session, and which can reduce a processing load on the computer system 101 and enable a number of participants in the multiplayer game session that exceeds a number that the computer system 101 could alone support. As described above, in various embodiments, by using the methods described herein, no changes are required at the remote computing system and the local-multiplayer mode is enabled at the local computer system.

After act 601, method 600 proceeds to one or more of an act 602 of associating a different gaming interface with each game stream, an act 603 of associating audio device(s) with the game streams, or an act 604 of facilitating joining of users to the game streams. As shown, there is no particular ordering among acts 602 to 604. In embodiments, these acts (if present) are performed serially or at least partially in parallel. In some embodiments, one or more of these acts (if present) are performed—at least partially—as part of act 601. For example, the association of a gaming interface device, an audio device, and/or a user identifier with a game stream may be made prior, or during, establishment of the game stream. Acts 603 and 604 are shown in broken lines, indicating that, in some embodiments, method 600 omits one or both of these acts.

In some embodiments, act 602 comprises identifying a plurality of gaming interface devices connected to the one or more user I/O interfaces and associating each of the plurality of gaming interface devices with a different game stream of the plurality of game streams. In an example, the inputs/outputs manager 302 identifies each of the gaming interface devices 111, and forms a mapping or association between those gaming interface devices 111 and the game streams established in act 601. In embodiments, there is a 1:1 mapping between the gaming interface devices 111 and the game streams, such that each gaming interface device 111 is uniquely mapped to a different game stream. In some embodiments, N:1 mappings between the gaming interface devices 111 and the game streams are supported, such that two or more gaming interface device 111 are mapped to at least one game stream. In embodiments, identifying gaming interface devices and mapping those gaming interface devices with game streams provides a technical benefit of enabling the routing of user inputs to each of the plurality of game streams, whether those game streams are provided locally or remotely. In embodiments, a technical benefit includes increasing the number of gaming interface devices 111 that a single user may use for their associated game stream.

In some embodiments, act 603 comprises identifying one or more audio devices connected to the one or more audio interfaces, and associating each of the one or more audio devices with one or more game streams of the plurality of game streams. In an example, the audio manager 303 identifies each of the audio device(s) 110, and forms a mapping or association between those audio devices 110 and the game streams established in act 601. In embodiments, there is a 1:1 mapping between the audio devices 110 and the game streams, such that each audio device 110 is uniquely mapped to a different game stream. In some embodiments, N:1 mappings between the audio devices 110 and the game streams are supported, such that two or more audio devices 110 are mapped to at least one single game stream (e.g., when the game steam utilizes local multiplayer support, such that two or more players having individual audio devices are associated with the game stream). In some embodiments, 1:M mappings between the audio devices 110 and the game streams are supported, such that a single audio device 110 is mapped to two or more game streams (e.g., when the audio device is a common audio device). Notably, in some embodiments act 603 is omitted, and all game streams are routed to the same default audio device (e.g., an audio component of the display device 114, a home theater system, etc.) without forming an active mapping or association. In embodiments, identifying audio devices and mapping those audio devices with game streams provides a technical benefit of enabling the routing of audio output from the game streams to appropriate audio devices, whether those game streams are provided locally or remotely.

Although not shown, in some embodiments method 600 comprises providing a display of suggested audio settings. For example, FIG. 4 illustrated an example 400 in which the audio manager 303 caused a display device 401 to display a message dialog 403 that suggests that the music volume for a particular game should be muted (0%) for all but one player, and the SFX volume for the game should be set as desired for each player. In embodiments, providing a display of suggested audio settings provides a technical benefit of enabling the use of audio settings that result in a clear presentation of audio generated by the plurality of game streams.

Although not shown, in some embodiments method 600 comprises modifying a game settings file for at least one instance of the multiplayer game in order to adjust audio settings for the at least one instance of the multiplayer game. In an example, the audio manager 303 adjusts audio settings on one or both of the game settings 107 at the computer system 101 or the game setting(s) 107' at the remote game source(s) 109. In embodiments, modifying a game settings file in order to adjust audio settings provides a technical benefit of enabling the use of audio settings that result in a clear presentation of audio generated by the plurality of game streams.

As discussed, method 600 may include an act 604 of facilitating joining of users to the game streams. Whether act 604 is present or omitted, in embodiments each game stream established in act 601 corresponds to a different user identifier of a plurality of user identifiers, and each of the plurality of user identifiers is joined to a single multiplayer session of the multiplayer game using the remote multiplayer support of the multiplayer game.

In some embodiments, act 604 is omitted and the association of user identifiers to game streams, as well as the joining to the single multiplayer session, is performed manually by players. For example, the players use the gaming interface devices 111 to navigate and utilize the remote multiplayer features of the multiplayer game 108.

In some embodiments, act 604 is present and act 604 comprises the computer system facilitating joining of the plurality of user identifiers to the single multiplayer session of the multiplayer game using the remote multiplayer support of the multiplayer game. In an example, the multiplayer manager 304 at the presentation component 106 determines which user identifiers to join to a multiplayer lobby and/or multiplayer session based on those user identifiers having been entered via the presentation component 106. In additional, or alternative, embodiments a cloud service computer system (e.g., one of the remote game source(s) 109) facilitates joining of the plurality of user identifiers to the single multiplayer session of the multiplayer game using the remote multiplayer support of the multiplayer game.

In embodiments, facilitating joining of the plurality of user identifiers to the single multiplayer session of the multiplayer game using the remote multiplayer support of the multiplayer game comprises automatically joining the plurality of user identifiers to at least one of a multiplayer lobby of the multiplayer game or the single multiplayer session of the multiplayer game. In one example, the presentation component 106 uses remote multiplayer support of the multiplayer game 108 to automatically join players to a multiplayer game lobby or game session.

In some embodiments, facilitating joining of the plurality of user identifiers to the single multiplayer session of the multiplayer game using the remote multiplayer support of the multiplayer game comprises identifying an association between the plurality of user identifiers based on each of the plurality of user identifiers as being identified by a component that establishes the plurality of game streams, such as by one or more of the presentation component 106 at the computer system 101 or by a presentation component 106' at one of the remote game source(s) 109.

In some embodiments, facilitating joining of the plurality of user identifiers to the single multiplayer session of the multiplayer game using the remote multiplayer support of the multiplayer game comprises identifying an association between the plurality of user identifiers based on each of the plurality of user identifiers as being associated with a common network. For example, as discussed, in some embodiments one or more multiplayer managers 304 operating at one or more remote game source(s) 109 ensure that a plurality of instances of the multiplayer game 108 operate within a common network by ensuring that they operate on the same LAN segment (e.g., using virtualize networking, VLAN tagging, etc.), that they operate on the same Internet Protocol (IP) subnet, etc. Thus, user identifiers associated with these game instances are also associated with this common network, and in embodiments these associations are used as a hint for joining users to a multiplayer lobby or multiplayer game session.

In embodiments, facilitating joining of users to the game streams, in whatever form that facilitation takes, provides a technical benefit of streamlining the process of utilizing multiplayer game features (for example, reducing the time taken, reducing the likelihood of errors, having corresponding reduced power utilization, reduced CPU usage, reduced network bandwidth consumption, and/or reduced memory usage).

Method 600 also comprises an act 605 of outputting a composite stream of the game streams. In some embodiments, act 605 comprises outputting, to the display interface, a composite stream of the plurality of game streams. In an example, the game stream presenter 305 generates the composite stream 115, and outputs it to the display device 114.

As shown, act 605 comprises one or more an act 606 of simultaneously presenting the game streams in a split-screen format, an act 607 of routing inputs from the gaming interface devices to associated game streams, or an act 608 of routing audio to associated audio device(s). As shown, there is no particular ordering among acts 606 to 608. In embodiments these acts (if present) are performed serially or at least partially in parallel. Act 608 is shown in broken lines, indicating that, in some embodiments, method 600 omits act 608.

In some embodiments, act 606 comprises, outputting the composite stream of the plurality of game streams, which includes each of the plurality of game streams in a split-screen display format for display at a single display device. In an example, the composite stream 115 displayed in FIG. 1 simultaneously shows two (or more) game streams 116 displayed side-by side in a single-row grid. FIGS. 4 and 5, on the other hand, each simultaneously show four game streams (i.e., 402a-402d and 502a-502d) in a two-by-two grid. Notably, embodiments include any type of split-screen layout that simultaneously shows the plurality of game streams, and are not limited to the examples shown. In embodiments, outputting a composite stream of the game streams provides a technical benefit of enabling a simultaneous display of each of the game streams, whether those game streams are provided locally or remotely.

In embodiments, when the game stream presenter 305 generates the composite stream 115, the game stream presenter 305 alters a size, resolution, aspect, etc. of one or more of the game streams. Thus, in embodiments, outputting the composite stream of the plurality of game streams comprises scaling one or more pixel dimensions of a plurality of frames of at least one of the plurality of game streams to fit the plurality of frames within a portion of the split-screen display format. In embodiments, altering a size, resolution, aspect, etc. of one or more of the game streams provides a technical benefit of ensuring that each game stream can simultaneously fit on a single display device. In various examples, the altering of a size, resolution, aspect, etc. may be performed in different ways for different ones of the plurality of game streams, for example, such that one game stream is scaled by a different amount to another game stream. This addresses a conflict in technical requirements: displaying an enlarged portion of an image for one user whilst maintaining an overview of a larger zone of interest for another user. In various examples, the game stream presenter 305 may generate a composite stream with different size portions of the overall display area being utilized for different ones of the plurality of game streams, to further address the conflict in technical requirements.

In some embodiments, act 607 comprises, while outputting the composite stream of the plurality of game streams, causing one or more input signals received from each of the plurality of gaming interface devices to be routed to its associated game stream. In an example, the inputs router 308 utilizes the associations made in act 602 to route the input(s)

112 of each gaming interface device 111 to an associated game stream. In embodiments, causing one or more input signals received from each of the plurality of gaming interface devices to be routed to its associated game stream provides a technical benefit of enabling players to interact with the game streams, whether those game streams are provided locally or remotely. In embodiments, when a game stream is provided remotely, a remote computing system does not need any adaptation as a consequence of this routing by the local computing device, and there is thus no additional overhead on the remote computing system as a result of having inputs for multiple game streams.

In some embodiments, act 608 comprises, while outputting the presentation of the plurality of game streams, outputting to the one or more audio interfaces, at least a portion of an audio stream of a plurality of audio streams, each audio stream of the plurality of audio streams corresponding to a single game stream. Notably, in some embodiments act 608 is omitted, and all audio streams are routed to the same default audio device (e.g., an audio component of the display device 114, a home theater system, etc.) irrespective of an active mapping or association. In embodiments, outputting at least a portion of an audio stream to the one or more audio interfaces provides a technical benefit of enabling players to hear audio generated by their corresponding game stream, whether their game stream is provided locally or remotely, whilst keeping to a low level the amount of noise caused by the other game streams of the co-located users.

In embodiments, act 608 comprises the audio mixer 307 mixing portions of two or more audio streams into a single audio stream, for routing by the audio router 306 at a "common" audio device(s) 110 associated with two or more users (e.g., display audio, a home theater system, etc.). Thus, in embodiments outputting, to the one or more audio interfaces, at least a portion of each of the plurality of audio streams corresponding to the plurality of game streams comprises combining at least a portion of a first of the plurality of audio streams with at least a portion of a second of the plurality of audio streams into a single audio stream. In embodiments, mixing portions of two or more audio streams into a single audio stream provides a technical benefit of enabling use of a single audio device by multiple players.

In embodiments, act 608 comprises the audio router 306 routing unique portions of two or more audio streams to "individual" audio device(s) 110, each associated with a single user (e.g., an audio headset, controller audio, etc.). Thus, in embodiments outputting, to the one or more audio interfaces, at least a portion of each of the plurality of audio streams corresponding to the plurality of game streams comprises routing at least a first portion of a first of the plurality of audio streams to a first audio output device corresponding to a first user (e.g., because the first audio streams corresponds to a first game stream to which the first user is associated), and routing at least a second portion of a second of the plurality of audio streams to a second audio output device corresponding to a second user (e.g., because the second audio streams corresponds to a second game stream to which the first user is associated). In embodiments, the "individual" audio device(s) 110 comprise common device types, such as audio headsets. Thus, in one example, the first audio output device is an audio headset, and the second audio output device is an audio headset. In other embodiments, the "individual" audio device(s) 110 comprise a mixture of device types, such as a mixture of audio headsets and controller audio. Thus, in another example the first audio output device is one of the plurality of gaming interface devices, and the second audio output device is one of the plurality of gaming interface devices. In embodiments, routing unique portions of audio streams to "individual" audio devices provides a technical benefit of ensuring that audio reaches an intended user, and a technical benefit of preventing the audio from reaching unintended users, which assists both with privacy and with clarity of the resulting sound, thereby making the sound more easily heard and understood.

In embodiments, act 608 comprises identifying a commonality between audio streams (even if time shifted), and subtracting (i.e., reducing or removing) the commonality in audio routed to one or more audio devices. For example, act 608 may comprise subtracting music tracks from audio routed to "individual" audio device(s) 110, while retaining it in audio routed to "common" audio device(s) 110. Thus, in embodiments outputting, to the one or more audio interfaces, at least the portion of the audio stream of the plurality of audio streams also includes routing a commonality between the first audio stream and the second audio stream to a third audio output device corresponding to both the first user and the second user, and reducing or removing the commonality from one or both of (i) the first audio stream routed to the first audio output device, or (ii) the second audio stream routed to the second audio output device. In some embodiments, the third audio output device is the same as the first audio output device discussed previously. In embodiments, identifying and subtracting audio commonalities provides a technical benefit of presenting multiple audio streams at a single audio device clearly, by avoiding the duplicate presentation of audio that is present in more than one audio stream.

As discussed, in various embodiments, commonalties are identified based on audio channel (e.g., in multi-channel audio), based on object detection (e.g., in object-based audio), or based on machine learning or pattern detection. Thus, in embodiments, detecting the commonality between the first audio stream and the second audio stream in act 608 is based on at least one of identifying an object type in an object-based audio format, identifying an audio channel in a multi-channel audio format, or detecting an audio similarity between the first audio stream and the second audio stream.

Although not shown, act 605 can comprise outputting one or more types of output data, generated by a game stream, a gaming interface device 111 associated with the game stream in act 602. For example, a game stream may generate one or more light outputs or haptic outputs for an output 113 of a game controller. In these embodiments, the presentation component 106 routes this output data to an associated gaming interface device 111. Thus, in some embodiments, method 600 comprises, while outputting the composite stream of the plurality of game streams, causing one or more haptic output signals received from each of the plurality of game streams to be routed to its associated gaming interface device. In other embodiments, method 600 comprises, while outputting the presentation of the plurality of game streams, causing one or more light output signals received from each of the plurality of game streams to be routed to its associated gaming interface device. In embodiments, outputting data generated by a game stream to a gaming interface device provides a technical benefit of enabling a game instance to provide feedback data directly to an appropriate player's gaming interface device.

Accordingly, the embodiments described herein address a technical problem of enabling multiple co-located players to engage in a multiplayer session of a game, even when that game lacks (or has limited) local multiplayer support. These embodiments address this technical problem by establishing multiple separate game streams (at least some of which utilize remote multiplayer support of a multiplayer game to join one or more of those co-located players), generating and presenting a composite stream which includes each of these multiple separate game streams, and appropriately mapping and routing inputs and outputs with respect to those multiple separate game streams. Additionally, by enabling game instances to be streamed from remote computer systems, at least some embodiments herein overcome the technical and hardware limitations that motivated the dropping of support for local split-screen multiplayer experiences games—that is, that a single computer system lacked sufficient processing and memory resources to support the execution and rendering of multiple perspectives of a multiplayer game session.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, SSDs, flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an OS and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A computer system for presenting a local multiplayer experience for a multiplayer game that lacks local multiplayer support, comprising:
   one or more processors;
   one or more user input/output (I/O) interfaces;
   a display interface; and
   a hardware storage device that stores computer-executable instructions that are executable by the one or more processors to cause the computer system to at least:
      establish a plurality of game streams, in which:
         each game stream comprises one or more downstream data channels and one or more upstream data channels,
         each game stream corresponds to a different instance of the multiplayer game, which includes remote multiplayer support, but which lacks local multiplayer support, and
         each game stream corresponds to a different user identifier of a plurality of user identifiers, each the plurality of user identifiers being joined to a single multiplayer session of the multiplayer game using the remote multiplayer support of the multiplayer game;
      identify a plurality of gaming interface devices connected to the one or more user I/O interfaces, wherein the plurality of gaming interface devices are co-located with the display interface;
      associate each of the plurality of gaming interface devices with a different game stream of the plurality of game streams;
      output, to the display interface, a composite stream of the plurality of game streams that simultaneously includes each of the plurality of game streams in a split-screen display format for display at a single display device; and
      while outputting the composite stream of the plurality of game streams, cause one or more input signals received from each of the plurality of gaming interface devices to be routed to its associated game stream.

2. The computer system of claim 1, wherein at least one of the plurality of game streams corresponds to a particular instance of the multiplayer game that executes at the computer system.

3. The computer system of claim 1, wherein at least one of the plurality of game streams corresponds to a particular instance of the multiplayer game that executes at a remote computer system.

4. The computer system of claim 3, wherein the remote computer system is one of a gaming console device, a personal computer, or a cloud service computer system.

5. The computer system of claim 1, the computer-executable instructions also including instructions that are executable by the one or more processors to cause the computer system to facilitate joining of the plurality of user identifiers to the single multiplayer session of the multiplayer game using the remote multiplayer support of the multiplayer game.

6. The computer system of claim 5, wherein a cloud service computer system facilitates joining of the plurality of user identifiers to the single multiplayer session of the multiplayer game using the remote multiplayer support of the multiplayer game.

7. The computer system of claim 5, wherein facilitating joining of the plurality of user identifiers to the single multiplayer session of the multiplayer game using the remote multiplayer support of the multiplayer game comprises identifying an association between the plurality of user identifiers based on at least one of, each of the plurality of user identifiers as being identified by a component that establishes the plurality of game streams; or each of the plurality of user identifiers as being associated with a common network.

8. The computer system of claim 5, wherein facilitating joining of the plurality of user identifiers to the single multiplayer session of the multiplayer game using the remote multiplayer support of the multiplayer game comprises automatically joining the plurality of user identifiers to at least one of, a multiplayer lobby of the multiplayer game; or the single multiplayer session of the multiplayer game.

9. The computer system of claim 1, the computer-executable instructions also including instructions that are executable by the one or more processors to cause the computer system to output recommended audio settings for the multiplayer game in order to mix a plurality of audio streams corresponding to the plurality of game streams.

10. The computer system of claim 1, the computer-executable instructions also including instructions that are executable by the one or more processors to cause the computer system to modify a game settings file for at least one instance of the multiplayer game in order to adjust audio settings for the at least one instance of the multiplayer game.

11. The computer system of claim 1, the computer-executable instructions also including instructions that are executable by the one or more processors to cause the computer system to output, to one or more audio interfaces, at least a portion of an audio stream of a plurality of audio streams, each audio stream of the plurality of audio streams corresponding to a single game stream, including routing at least a first portion of a first audio stream of the plurality of audio streams to a first audio output device corresponding to a first user, and routing at least a second portion of a second audio stream of the plurality of audio streams to a second audio output device corresponding to a second user.

12. The computer system of claim 11, wherein outputting, to the one or more audio interfaces, at least the portion of the audio stream of the plurality of audio streams also includes, routing a commonality between the first audio stream and the second audio stream to a third audio output device corresponding to both the first user and the second user; and reducing or removing the commonality from one or both of (i) the first audio stream routed to the first audio output device, or (ii) the second audio stream routed to the second audio output device.

13. The computer system of claim 12, the computer-executable instructions also including instructions that are executable by the one or more processors to cause the computer system to detect the commonality between the first audio stream and the second audio stream based on at least one of, identifying an object type in an object-based audio format;

identifying an audio channel in a multi-channel audio format; or detecting an audio similarity between the first audio stream and the second audio stream.

14. The computer system of claim 1, wherein outputting the composite stream of the plurality of game streams comprises scaling one or more pixel dimensions of a plurality of frames of at least one of the plurality of game streams to fit the plurality of frames within a portion of the split-screen display format.

15. The computer system of claim 1, the computer-executable instructions also including instructions that are executable by the one or more processors to cause the computer system to, while outputting the composite stream of the plurality of game streams, cause one or more haptic output signals received from each of the plurality of game streams to be routed to its associated gaming interface device.

16. A method, implemented at a computer system that includes a processor, the method comprising:

establishing a plurality of game streams, in which:

each game stream corresponds to a different instance of a multiplayer game, which includes remote multiplayer support, but which lacks local multiplayer support, and each game stream corresponds to a different user identifier of a plurality of user identifiers, each the plurality of user identifiers being joined to a single multiplayer session of the multiplayer game using the remote multiplayer support of the multiplayer game;

identifying a plurality of gaming interface devices connected to one or more user input/output interfaces, wherein the plurality of gaming interface devices are co-located with a display interface;

associating each of the plurality of gaming interface devices with a different game stream of the plurality of game streams;

outputting, to the display interface, a composite stream of the plurality of game streams that simultaneously includes each of the plurality of game streams in a split-screen display format for display at a single display device; and while outputting the composite stream of the plurality of game streams, causing one or more input signals received from each of the plurality of gaming interface devices to be routed to its associated game stream.

17. The method of claim 16, wherein a first of the plurality of game streams corresponds to a first instance of the multiplayer game that executes at the computer system, and a second of the plurality of game streams corresponds to a second instance of the multiplayer game that executes at a remote computer system.

18. The method of claim 16, further comprising facilitating joining of the plurality of user identifiers to the single multiplayer session of the multiplayer game using the remote multiplayer support of the multiplayer game.

19. The method of claim 16, further comprising outputting, to one or more audio interfaces, at least a portion of an audio stream of a plurality of audio streams, each audio stream of the plurality of audio streams corresponding to a single game stream, including routing at least a first portion of a first of the plurality of audio streams to a first audio output device corresponding to a first user, and routing at least a second portion of a second of the plurality of audio streams to a second audio output device corresponding to a second user.

20. A non-transitory computer-readable medium that stores computer-executable instructions that are executable by a processing system to at least:

establish a plurality of game streams, in which:

each game stream comprises one or more downstream data channels and one or more upstream data channels, each game stream corresponds to a different instance of a multiplayer game, which includes remote multiplayer support, but which lacks local multiplayer support, and each game stream corresponds to a different user identifier of a plurality of user identifiers, each the plurality of user identifiers being joined to a single multiplayer session of the multiplayer game using the remote multiplayer support of the multiplayer game;

identify a plurality of gaming interface devices connected to one or more user input/output interfaces, wherein the plurality of gaming interface devices are co-located with a display interface;

associate each of the plurality of gaming interface devices with a different game stream of the plurality of game streams;

output, to the display interface, a composite stream of the plurality of game streams that simultaneously includes each of the plurality of game streams in a split-screen display format for display at a single display device; and while outputting the composite stream of the plurality of game streams, cause one or more input signals received from each of the plurality of gaming interface devices to be routed to its associated game stream and outputs generated by each gaming stream to be routed to its associated gaming interface device.

\* \* \* \* \*